M. BRANDENSTEIN.
PROCESS OF AND APPARATUS FOR PRESERVING FOOD PRODUCTS.
APPLICATION FILED JAN. 9, 1917.
1,277,183.
Patented Aug. 27, 1918.
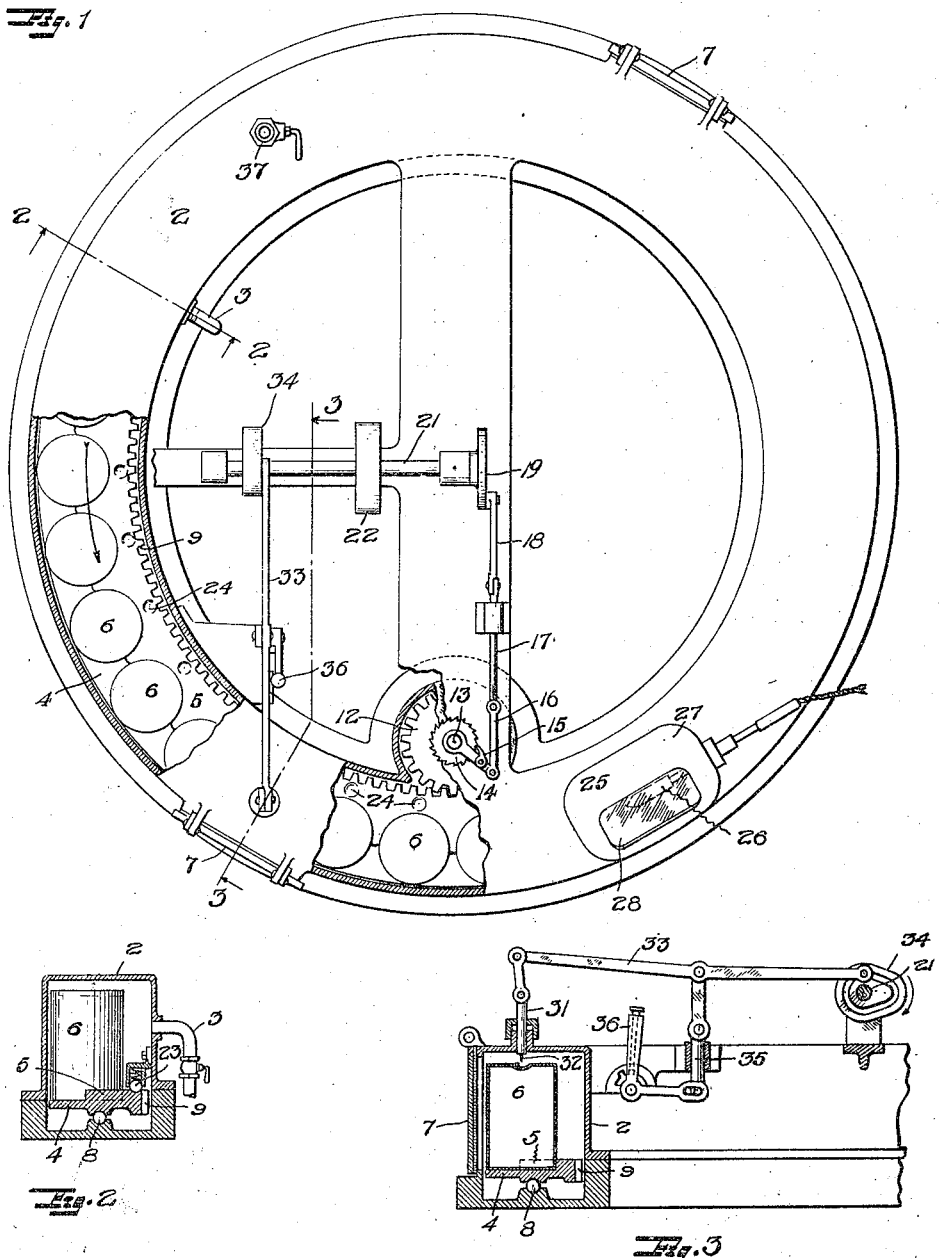
WITNESSES:
J. B. Gardner
INVENTOR.
MANFRED BRANDENSTEIN.
BY White & Prost
HIS ATTORNEYS

UNITED STATES PATENT OFFICE.

MANFRED BRANDENSTEIN, OF SAN FRANCISCO, CALIFORNIA.

PROCESS OF AND APPARATUS FOR PRESERVING FOOD PRODUCTS.

1,277,183.  Specification of Letters Patent.  Patented Aug. 27, 1918.

Application filed January 9, 1917.  Serial No. 141,397.

*To all whom it may concern:*

Be it known that I, MANFRED BRANDENSTEIN, a citizen of the United States, and a resident of the city and county of San Francisco and State of California, have invented a certain new and useful Process of and Apparatus for Preserving Food Products, of which the following is a specification.

The invention relates to a process of preserving food products in sealed receptacles and an apparatus for vacuumizing and sealing the receptacles.

An object of the invention is to provide a process for improving and rendering uniform the quality of the preserved food product.

Another object of the invention is to provide a vacuumizing and sealing apparatus for subjecting all receptacles to the same vacuumization.

The invention possesses other advantageous features, some of which, with the foregoing, will be set forth at length in the following description, where I shall outline in full the process and that form of the apparatus which I have selected for illustration in the drawings accompanying and forming part of the present specification. In said drawings I have shown only one embodiment of my invention, but it is to be understood that the invention as set forth in the succeeding claims may be embodied in a plurality of forms.

Referring to said drawings,

Figure 1 is a top or plan view of the apparatus of my invention, parts thereof being broken away to disclose the interior construction.

Fig. 2 is a section on the line 2—2, Fig. 1.

Fig. 3 is a section on the line 3—3, Fig. 1.

The process and apparatus of my invention is particularly adapted for use in the packing of roasted coffee in sealed vacuumized sheet metal cans, but it may be used advantageously in packing and preserving other food products. It has been the practice heretofore in packing roasted coffee, to place the filled unsealed cans in a chamber, then vacuumize the chamber and then seal the successive cans. By such method the cans were exposed to the action of a vacuum for varying periods of time, and I have found that the quality of the packed coffee varied in proportion to the time of vacuumization. By making the time of vacuumization uniform, the quality of the coffee in all of the cans is uniform, thereby insuring the packer of a uniform pack, and by choosing the proper length of time under the various conditions, a pack of better quality is assured.

In accordance with my invention, I place the sealed filled can in a closed chamber, then vacuumize the chamber and punch a hole in the can to allow the air or gases therein to be exhausted and after subjecting the punctured can to the vacuum for a predetermined time, the hole is sealed and the can subsequently removed from the chamber. A plurality of cans are usually placed in the chamber at one time and advanced to the sealing station at a uniform rate and are punctured at a fixed position in advance of the sealing station, the rate of progress of the cans and the distance of the puncturing station from the sealing station determining the time during which the interiors of the cans are subjected to the vacuum.

The apparatus comprises a chamber 2, preferably annular in shape, which is suitably connected to a vacuum receiver by the valved pipe 3. Arranged within the chamber is a rotatable table or turret 4 which is provided with guides 5 for properly positioning and spacing the cans 6, so that they are uniformly spaced. The cans are placed on or removed from the turret through openings in the side wall of the chamber normally closed by doors 7. The turret is preferably mounted on balls 8 so that it rotates easily and is provided on its inner edge with a rack 9 which is engaged by a gear 12 arranged within the chamber. The gear 12 is secured to the shaft 13 which extends through a suitable stuffing box in the wall of the chamber and is provided on its upper end with a ratchet wheel 14 which is engaged by the pawl 15 on the reciprocating link 16. The link is connected to the reciprocating bar 17 which is connected to the link 18, adjustably connected to the pitman 19, which is secured to the rotatable shaft 21. As the shaft 21 rotates, the gear 12 and consequently the turret 4, is moved in a step-by-step motion, that is, a movement having alternate periods of rest and motion. The link 18 is so connected to the pitman 19, that at each movement the turret is advanced a distance equal to the distance between the centers of two adjacent cans. The shaft 21 is driven by a pulley 22 or other suitable means. In order to insure a uniform advance of the turret for each rotation of the shaft and thereby insure the proper positioning of the cans, I have provided means for arresting the movement of the turret after it has been advanced the proper distance. Many different devices may be employed for this purpose and in the drawings I have shown a spring-pressed ball 23, which seats in successive, uniformly spaced depressions 24 in the turret, the depressions being spaced apart the distance of the successive can centers.

The filled sealed cans are placed on the turret with a small piece of solder and a drop of flux on their tops, preferably in a small depression in the center of the top of the can, and the cans are advanced toward the sealing station 25. The sealing station comprises an electrically heated soldering iron 26, the handle of which extends through a dome 27 to the outside of the chamber so that it can be manipulated. A glass window 28 in the dome enables the operator to move the soldering iron to seal the puncture in the top of the can.

The puncture is made in the top of the can at a fixed distance in advance of the sealing station, so that the contents of all of the cans are subjected to the vacuum for equal lengths of time.

The can top puncturing apparatus comprises a plunger 31 passing through a suitable stuffing box in the top of the chamber and provided on its lower end with a pin 32 which forms an aperture in the top of the can. The plunger is connected to a lever 33 which is moved by a cam 34 mounted on shaft 21, the cam being so disposed and proportioned that the plunger is reciprocated to form the aperture during the time that the turret is at rest. Means are provided for throwing the can-puncturing means out of operation so that a can previously punctured, vacuumized and sealed, will not be punctured a second time. The lever 33 is fulcrumed on a bar 35 which is vertically movable by the handle 36, which is provided with a latch to lock it in the desired position. When the bar is locked in its lower position, the plunger operates to perforate the cans, but when locked in the raised position, the plunger is raised so that it does not contact with the cans.

When all the cans have been punctured and sealed, the valve in pipe 3 is closed, the exhaust valve 37 is opened to relieve the vacuum in the chamber, the gates 7 are opened and the cans removed.

I claim:

1. The method of preserving food products, which consists in placing the product in a receptacle, sealing the receptacle, making an opening in said receptacle *in vacuo* and sealing the opening *in vacuo*.

2. The method of preserving food products, which consists in placing the product in a receptacle, sealing the receptacle, making an opening in said receptacle *in vacuo*, subjecting the opened receptacle to the action of the vacuum for a predetermined time and sealing the opening *in vacuo*.

3. In a vacuum sealing machine, a chamber adapted to be vacuumized, a sealing station in said chamber, means for moving receptacles to be sealed to said sealing station and means for making an opening in said receptacles in said chamber before they reach the sealing station.

4. In a vacuum sealing machine, a chamber adapted to be vacuumized, a sealing station in said chamber, means for moving receptacles to be sealed to the sealing station and a device arranged over the moving means in advance of the sealing station for making an aperture in the receptacle in said vacuumized chamber.

5. In a vacuum sealing machine, a chamber adapted to be vacuumized, a sealing station in said chamber, means for advancing receptacles in a step-by-step movement to the sealing station and means in said chamber arranged in advance of the sealing station and operative during the period of rest of the advancing means for making an aperture in the receptacle.

6. In a vacuum sealing machine, a chamber adapted to be vacuumized, a sealing station in said chamber, means for advancing receptacles to the sealing station, means connected to the advancing means for making apertures in said receptacles in said chamber before they reach the sealing station, and means for throwing the aperture-making means out of operation.

7. In a vacuum sealing machine, a chamber adapted to be vacuumized, a turret in said chamber, guides on said turret for positioning receptacles thereon, a sealing station in said chamber, means for rotating said turret to bring the receptacles to the sealing station, and means for making an aperture in each receptacle in the chamber before it reaches the sealing station.

8. In a vacuum sealing machine, a chamber adapted to be vacuumized, a turret in said chamber, guides on said turret for positioning receptacles thereon, means for rotating the turret in a step-by-step movement, means operative during the period of rest of the turret for making an aperture in a receptacle thereon and means spaced from said aperture-forming means for sealing said aperture.

9. In a vacuum sealing machine, a chamber adapted to be vacuumized, a turret in said chamber, guides on said turret for positioning receptacles thereon, means for rotating the turret in a step-by-step movement, means for limiting the movement of each step to the distance between the centers of two successive receptacles, means for forming an aperture in a receptacle on said turret and means for sealing said aperture spaced from said aperture-forming means.

10. In a vacuum sealing machine, a chamber adapted to be vacuumized, a sealing station in said chamber, a plunger arranged in said chamber, means for operating the plunger to make an aperture in a receptacle and means for moving the apertured receptacle to the sealing station.

In testimony whereof, I have hereunto set my hand at San Francisco, California, this 3rd day of January 1917.

MANFRED BRANDENSTEIN.

In presence of—
　MARGUERITE S. BRUNER,
　J. B. GARDNER.